Figure 11:
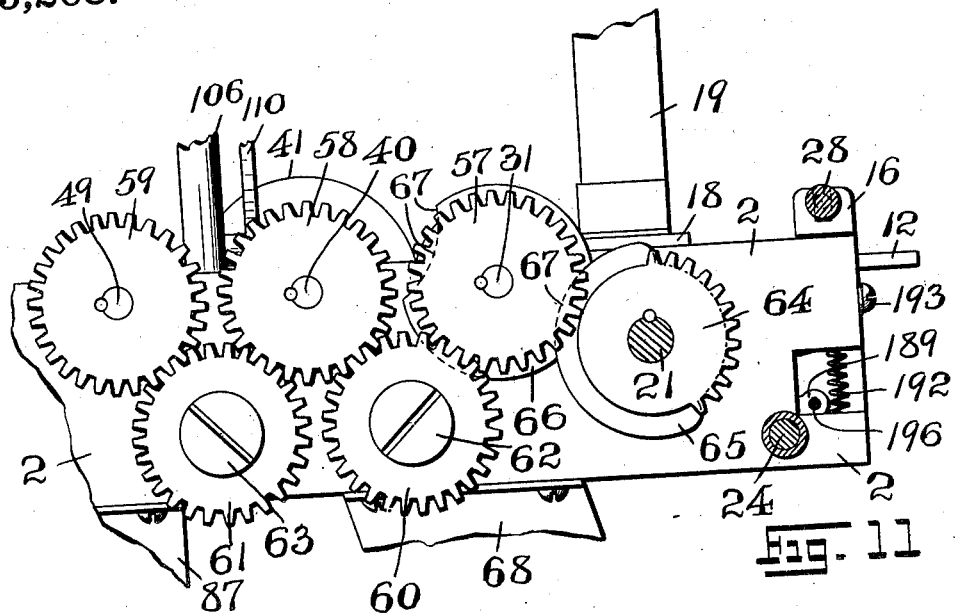

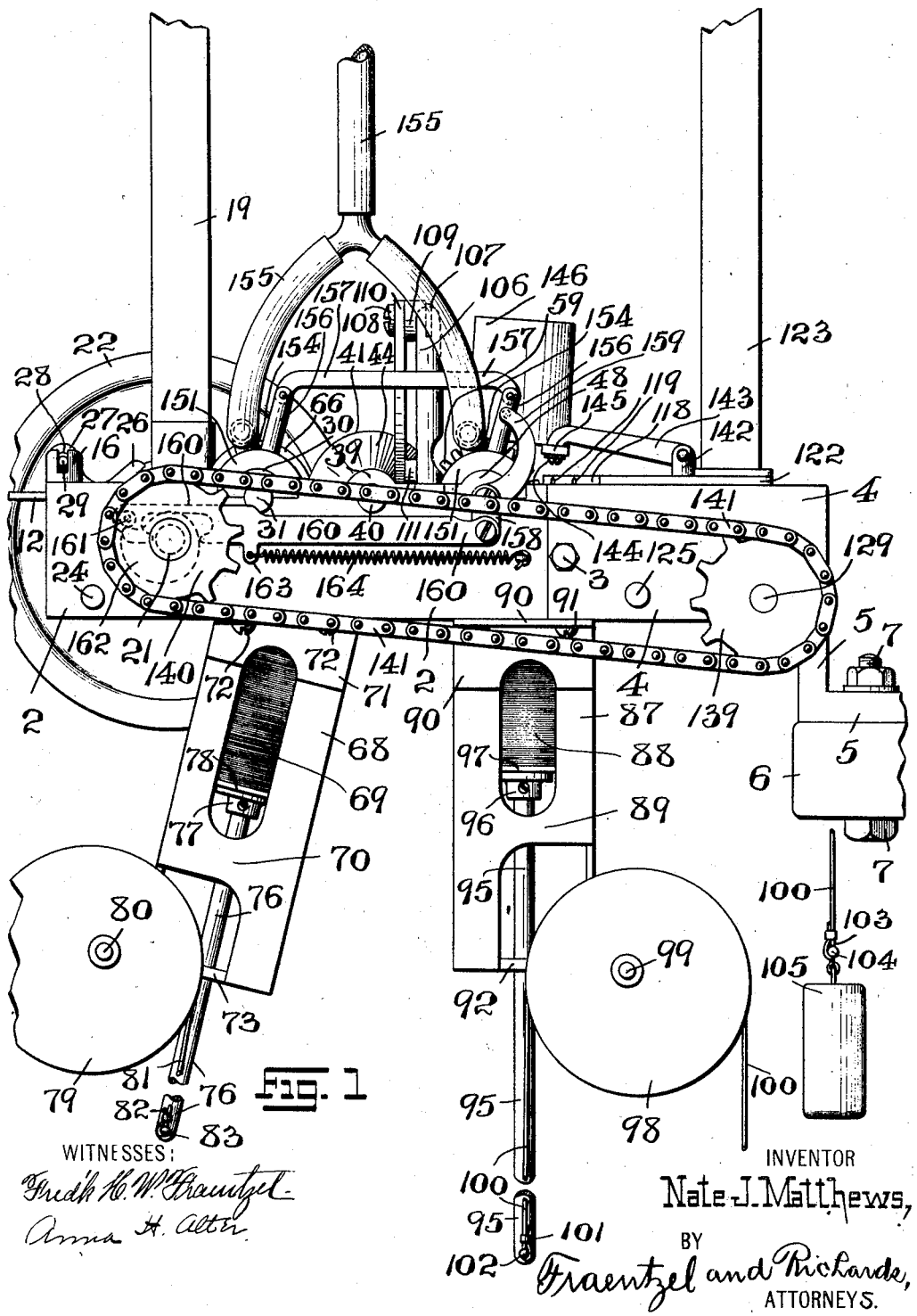

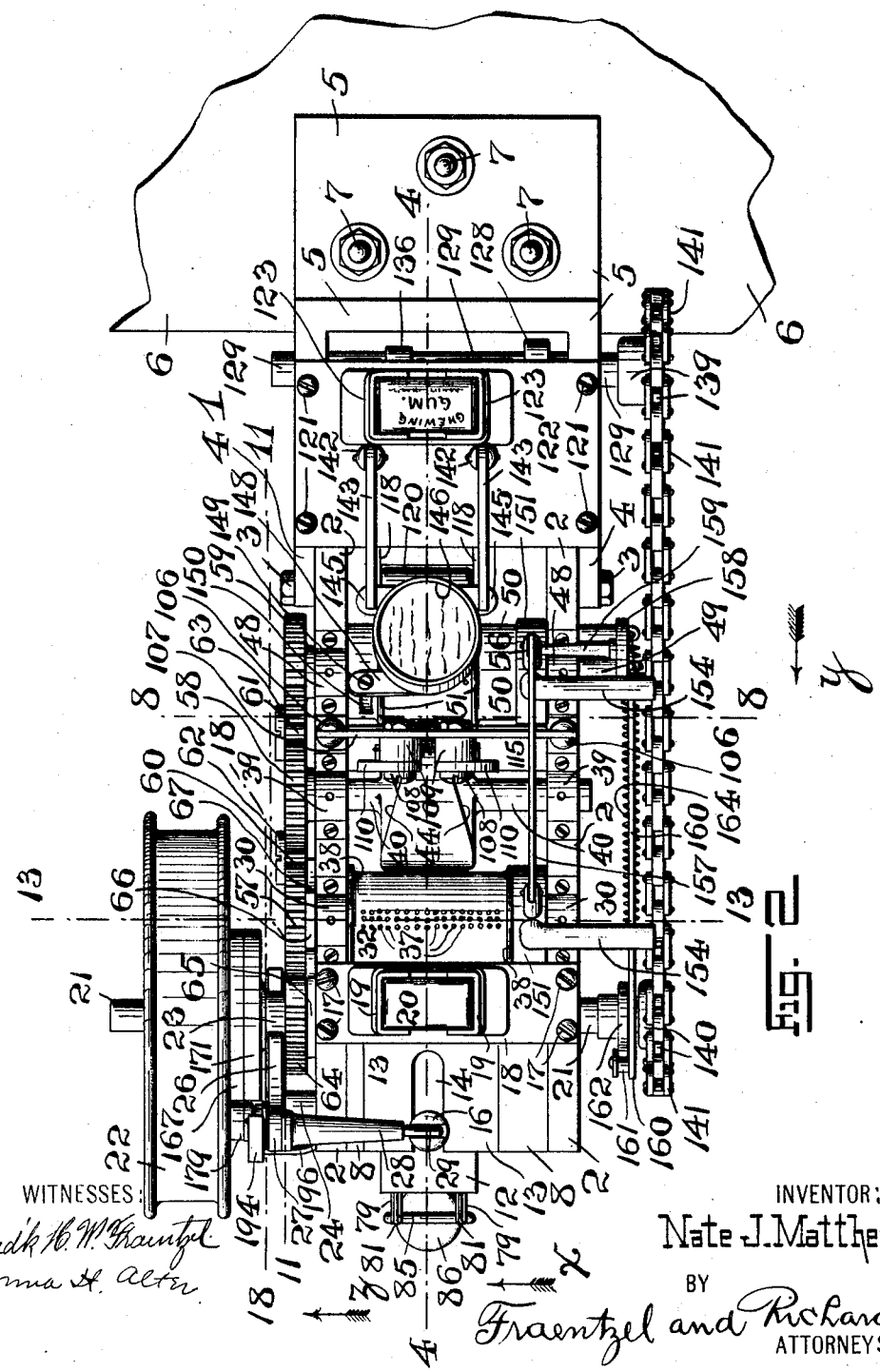

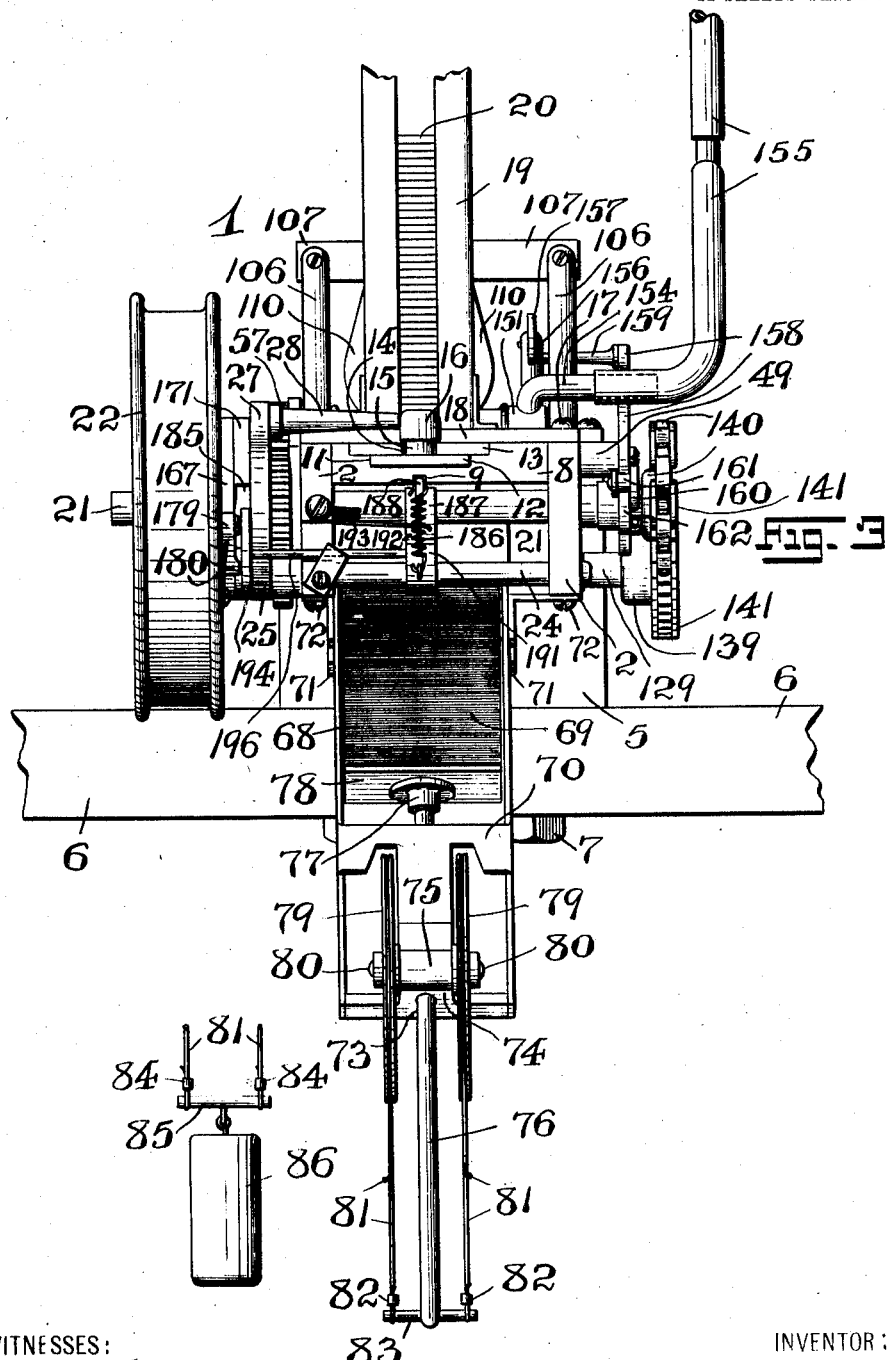

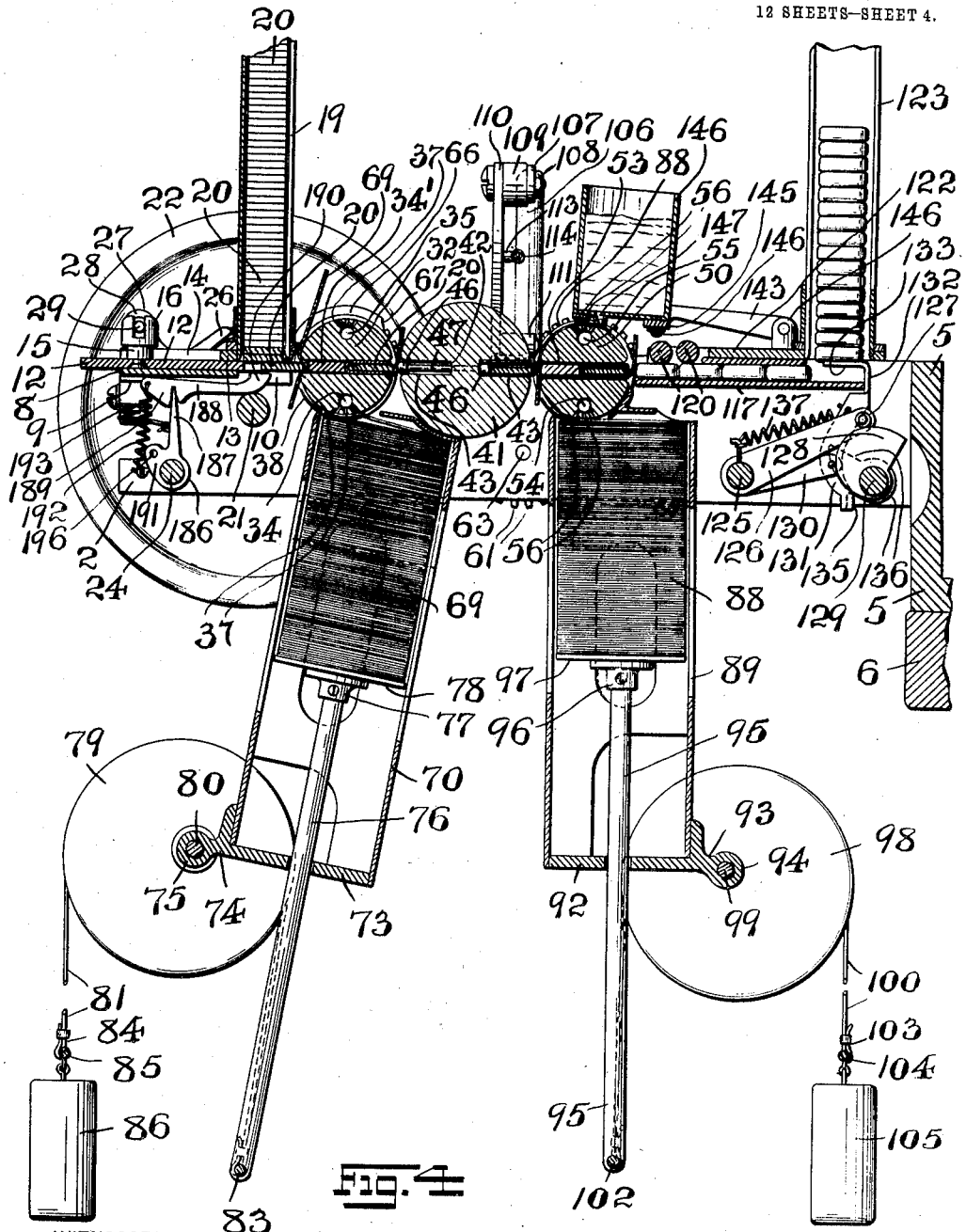

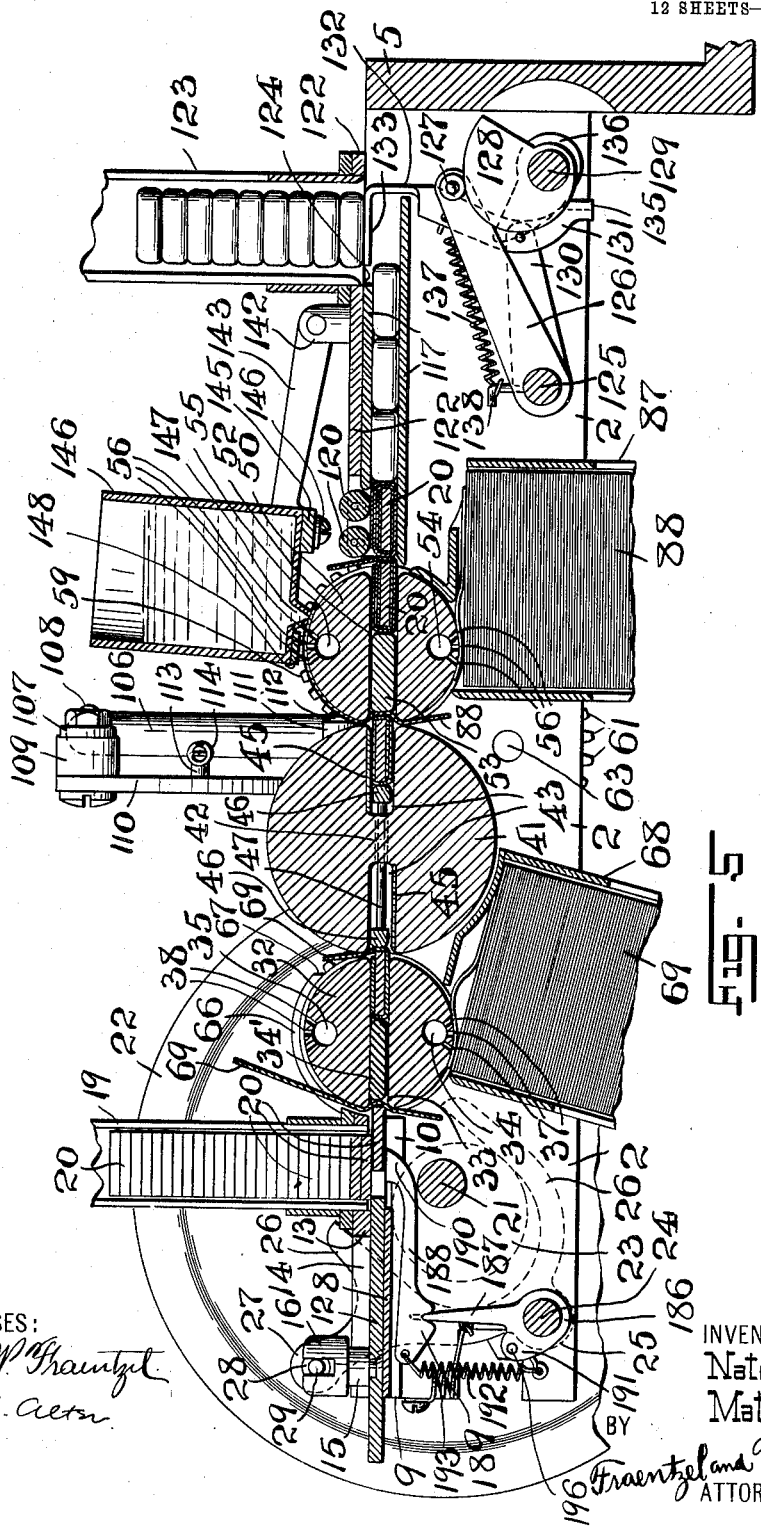

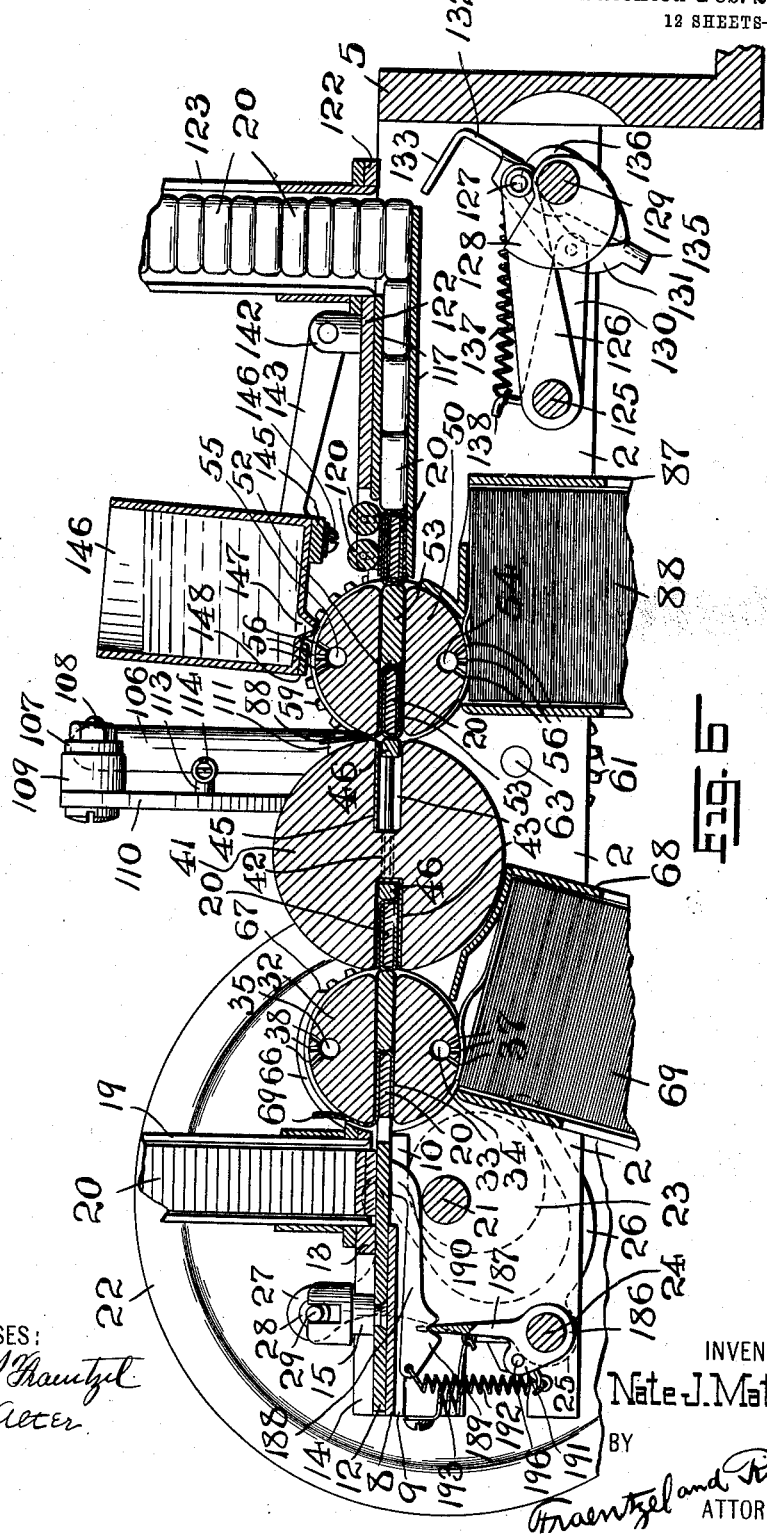

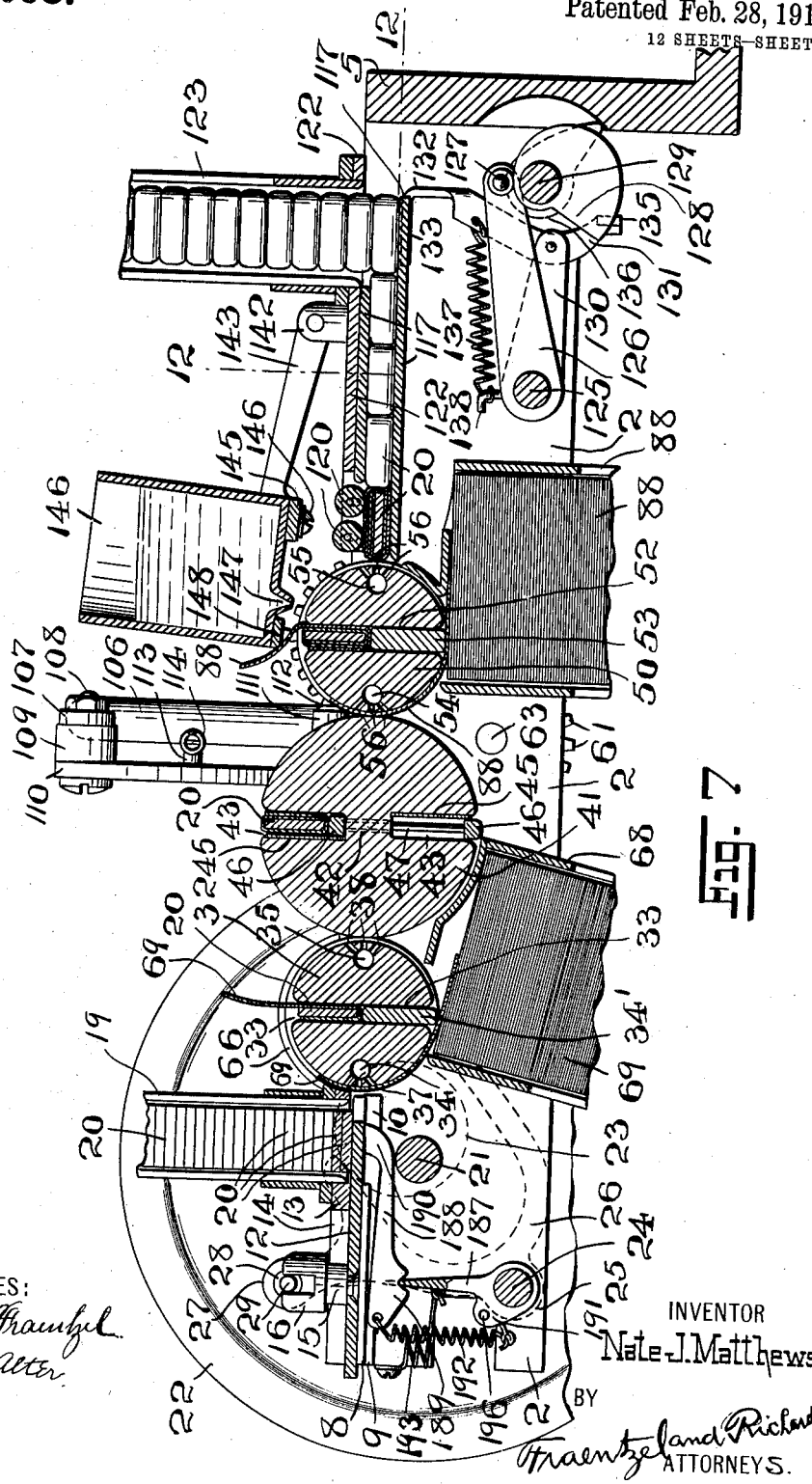

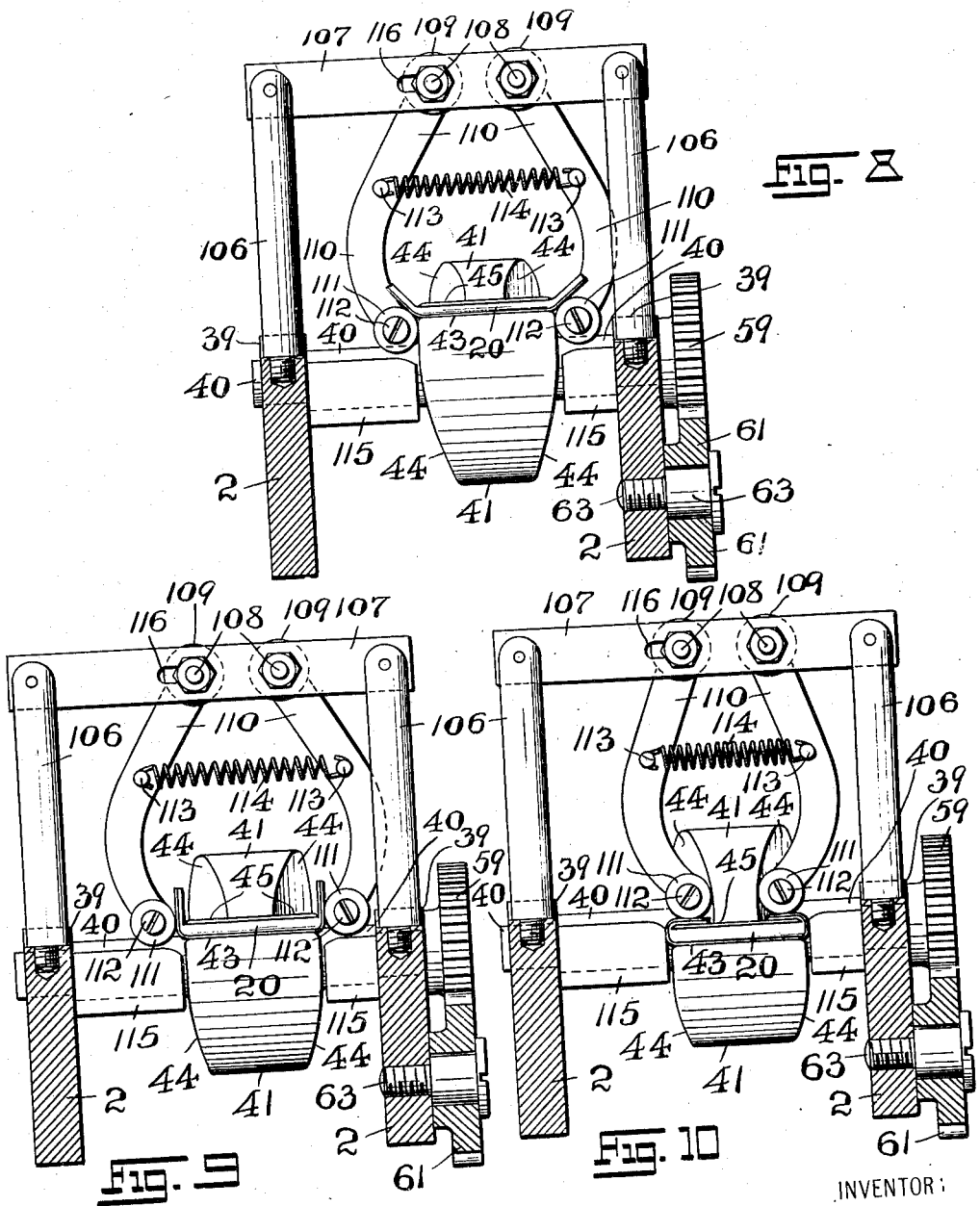

N. J. MATTHEWS.
WRAPPING MACHINE.
APPLICATION FILED JAN. 28, 1909. RENEWED AUG. 30, 1910.

985,268.

Patented Feb. 28, 1911.
12 SHEETS—SHEET 9.

WITNESSES:
Fredk. H. W. Fraentzel
Anna H. Alter.

INVENTOR:
Nate J. Matthews,
BY
Fraentzel and Richards,
ATTORNEYS.

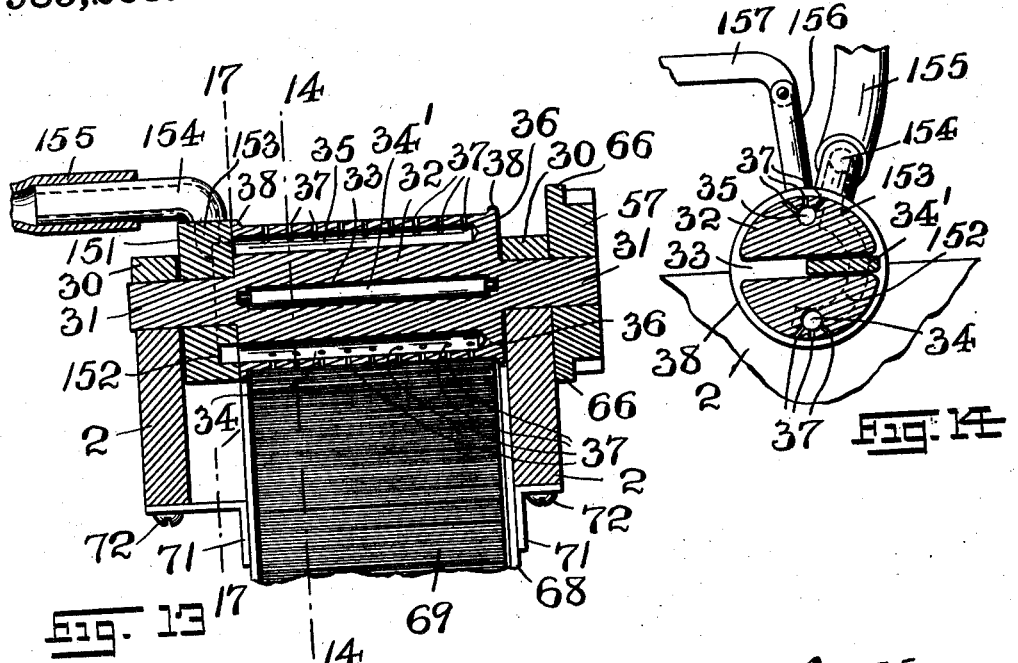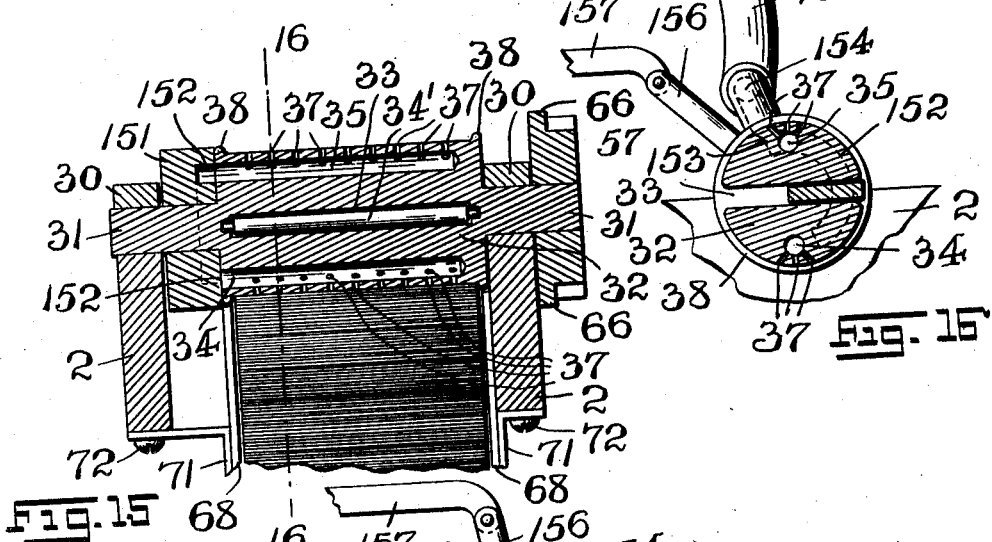

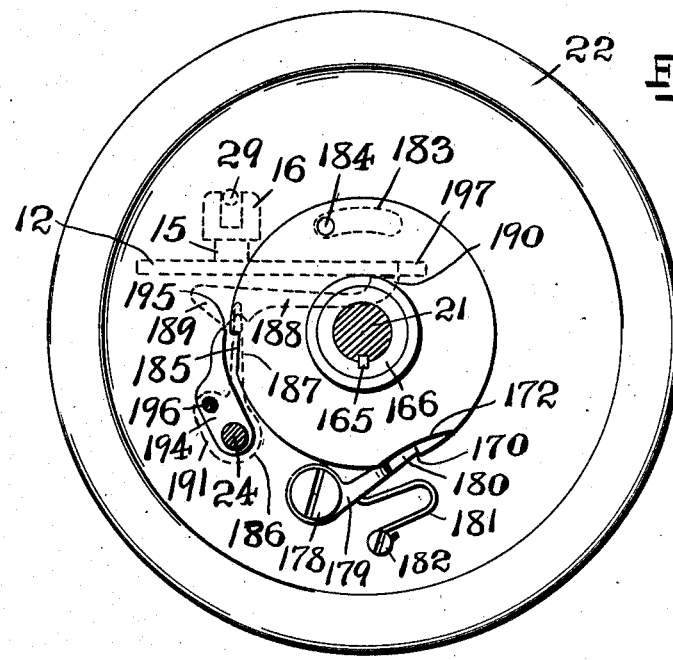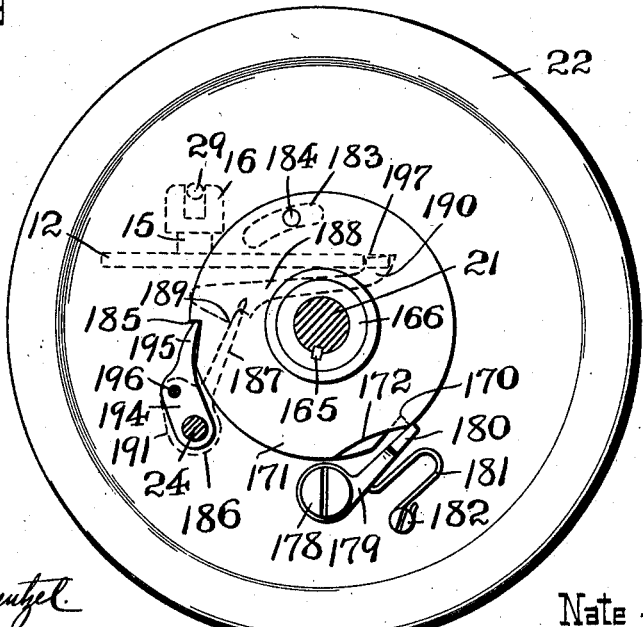

N. J. MATTHEWS.
WRAPPING MACHINE.
APPLICATION FILED JAN. 28, 1909. RENEWED AUG. 30, 1910.
985,268.
Patented Feb. 28, 1911.
12 SHEETS—SHEET 12.
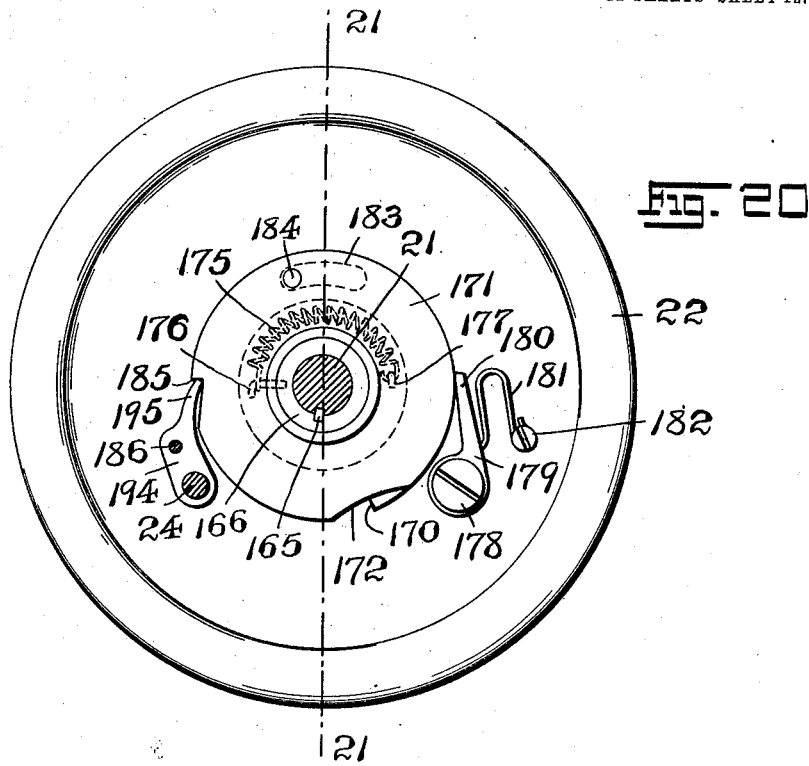
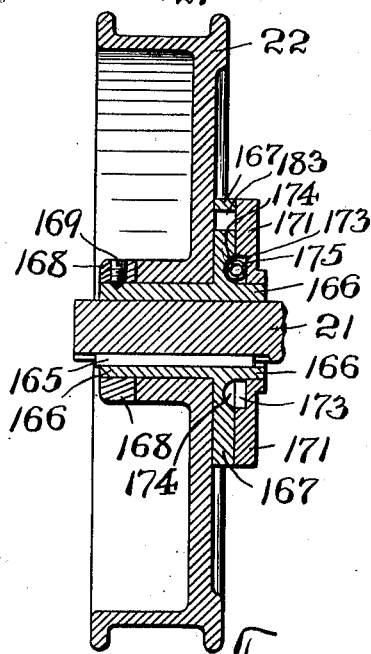
WITNESSES:
Fred'k H. W. Fraentzel
Anna H. Alter
INVENTOR:
Nate J. Matthews,
BY
Fraentzel and Richards
ATTORNEYS

UNITED STATES PATENT OFFICE.

NATE J. MATTHEWS, OF NEWARK, NEW JERSEY.

WRAPPING-MACHINE.

985,268.  Specification of Letters Patent.  Patented Feb. 28, 1911.

Application filed January 28, 1909, Serial No. 474,699. Renewed August 30, 1910. Serial No. 579,748.

*To all whom it may concern:*

Be it known that I, NATE J. MATTHEWS, a citizen of the United States, residing at Newark, in the county of Essex and State of New Jersey, have invented certain new and useful Improvements in Wrapping-Machines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic wrapping machines; and the invention relates, more particularly, to a novel construction of apparatus and the devices and parts thereof by means of which numerous articles, such for example as chewing-gum, candy, soap, and the like, may be provided with a paper wrapper.

The principal object of the present invention is to provide a novel and comparatively simple wrapping machine, in the construction of which the devices and parts which comprise the apparatus have been reduced to a minimum, in order to obtain the least possible complication, and still provide an automatic, positively acting, efficient, and rapid operating machine for wrapping in paper and labeling various articles, such as chewing-gum, candy, soap and many other things of like nature which it is desired to provide with paper wrappers.

A further object of the present invention is to provide a combination of mechanical and pneumatic devices, hereinafter more particularly described, whereby the wrapping-paper and labels, already accurately cut to proper sizes, before being deposited in the machine, may be accurately, surely and rapidly manipulated to feed the same into their proper positions ready for the wrapping and labeling operations.

Other objects of the present invention not at this time more particularly enumerated will be clearly understood from the following detailed description of my present invention.

With these various objects of the invention in view, the same consists, primarily, in the novel wrapping-machine hereinafter set forth; and, furthermore, this invention consists in the novel arrangements and combinations of the various devices and parts, as well as in the details of the construction of the same, all of which will be hereinafter more fully described in the following specification, and then finally embodied in the clauses of the claim which are appended to and which form an essential part of this specification.

The invention is clearly illustrated in the accompanying drawings, in which:—

Figure 12:
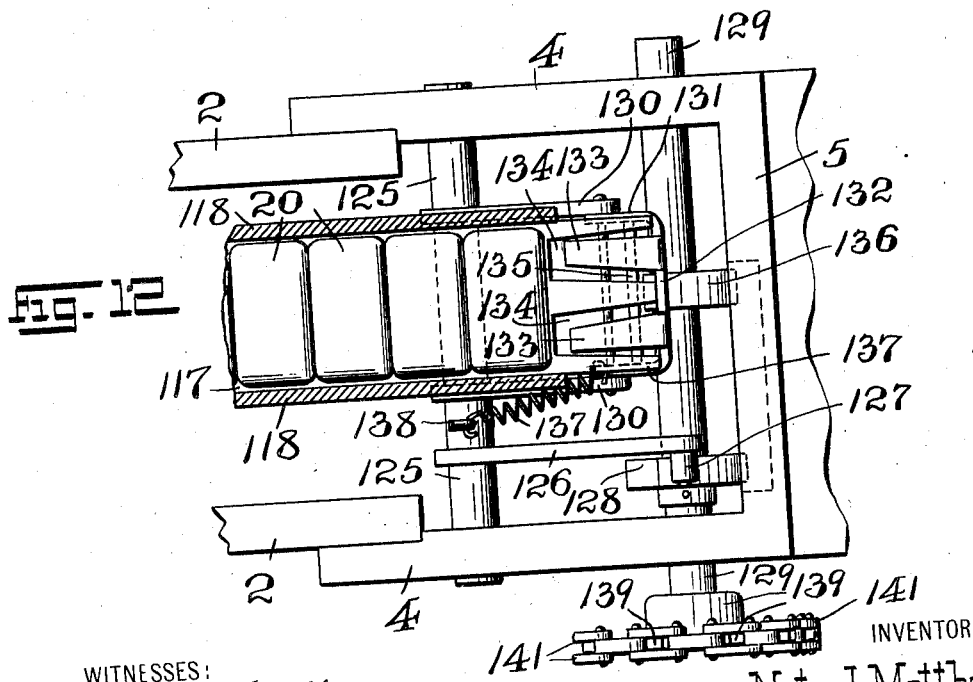

Figure 1 is a side elevation of a wrapping-machine made according to and embodying the novel features of my present invention; Fig. 2 is a top or plan view of the same; Fig. 3 is an end view of the machine; and Fig. 4 is a longitudinal vertical section, taken on line 4—4 in said Fig. 2, and looking in the direction of the arrow *x*. Figs. 5, 6 and 7, are longitudinal vertical sections, similar to the section represented in Fig. 4, but drawn upon a larger scale, and severally illustrating the various stages of certain of the wrapping operations. Figs. 8, 9 and 10 are detail vertical cross-sections taken respectively on line 8—8 in said Fig. 2, and looking in the direction of the arrow *y*, these views illustrating, more particularly, the end wrapping operation in its several stages. Fig. 11 is a detail longitudinal vertical section taken on line 11—11 in said Fig. 2, and illustrating more particularly a gearing adapted to operate the wrapping devices; Fig. 12 is a detail horizontal section, taken on line 12—12 in said Fig. 7, and illustrating the apparatus manipulating the wrapped article and conveying the same into a receiving chute. Fig. 13 is a detail vertical cross-section, taken on line 13—13 in said Fig. 2, looking in the direction of the arrow *y*, and illustrating, more particularly, an arrangement of the combined mechanical and pneumatic mechanism for manipulating the wrapping paper so as to present the same ready for the wrapping operations. Fig. 14 is a detail cross-section, taken on line 14—14 in said Fig. 13, showing more particularly a cut-off valve mechanism. Fig. 15 is a view similar to that shown in Fig. 13, illustrating the operation of the cut-off valve mechanism, and Fig. 16 is a detail cross section, taken on line 16—16 in said Fig. 15. Fig. 17 is a detail cross-section, taken on line 17—17 in said Fig. 13; and Fig. 18 is a detail vertical section, taken on line 18—18, in said Fig. 2, looking in the direction of the arrow z, and illustrating the driving mechanism of the wrapping machine and its automatic release. Figs. 19 and 20 are similar views, showing different stages of the operation of the automatic release of said driving mechanism; and Fig. 21 is a vertical cross section of the same, said section being taken on line 21—21 in said Fig. 20.

Similar characters of reference are employed in all of the said herein above described views, to indicate corresponding parts.

Referring now to the several figures of the drawings, the reference-character 1 indicates the complete apparatus showing one embodiment of the novel wrapping machine, the same comprising a pair of side-frames or members 2, secured by means of bolts 3 to the side-arms 4 of a supporting bracket 5, the same being adapted to be secured to a table or bench 6, by means of bolts 7. Secured between the outer and upper ends of said frames or members 2 is a bed-plate 8 the same being provided upon its under side with a groove or channel 9, which terminates upon the inner end of said bed-plate 8 in a suitable slot or opening 10. The upper surface of said bed-plate 8 is provided with a channel or groove 11, in which is slidably arranged a push-plate 12. Secured to said bed-plate 8, and arranged above said push-plate 12, is a keeper-plate 13 which is provided with a slot or opening 14 to permit the passage therethrough of a stud 15 which is secured to said push-plate 12, the upper portion of said stud 15 being provided with a slotted head 16.

Secured upon the side-frames or members 2, by means of screws 17 or the like, is a base-plate 18 acting as a support for a feed-chute 19, in which are adapted to be arranged the pieces or articles to be wrapped, the drawings in this instance showing the said articles to be in the form of rectangular pieces 20, usually chewing-gum.

Rotatably mounted in bearing portions in the side-frames of members 2 is a main driving shaft 21, said shaft extending laterally across the space between said side-frames or members. One end of said shaft is provided with a driving pulley 22 and an automatic clutch-mechanism connected therewith which will be hereinafter more particularly described, together with the means for operating the same. Secured upon said shaft 21 is a cam 23, and mounted between said frames or members 2 is another shaft 24, upon the one end of which is pivotally secured a bell-crank 25, said crank being provided with a U-shaped member or yoke 26 which straddles the said cam 23. Said crank 25 is further provided with an upwardly extending arm 27, to the free end of which is secured an inwardly extending arm 28, the free end 29 of said arm 28 being adapted to engage with the slotted head 16 of said stud 15, so that the movement of said crank 25, caused by said cam 23, is transmitted to said push-plate 12, and thereby producing the reciprocatory sliding movements of said push-plate.

Mounted between the frames or members 2 and in bearings 30 are the journals 31 of a wrapping-roll or cylinder 32. The said cylinder 32 is provided with a transverse or diametrically disposed opening or slot 33 in which is slidably arranged a push-device or element, as 34', which may be in the form of a push-plate or a sliding bolt. The said cylinder 32 is further provided on each side of the said transverse opening or slot 33 with longitudinally extending holes or openings 34 and 35, and closed at one end by the wall 36. The outer surface of said cylinder 32 is provided at points adjacent to said holes or openings 34 and 35 with a plurality of small holes or perforations 37, the same leading into the said longitudinally extending holes or openings 34 and 35 and along the entire length of the latter. The said cylinder 32 is provided with a pair of guides or ribs 38, separated by a distance which is equal to the width of the paper to be wrapped about the chewing-gum 20, or other article.

Mounted between the frames or members 2 and in suitable bearings 39 are the journals 40 of a cam shaped transmitting-roll 41 which is made at least as wide as the article which is to be wrapped. Extending through to a central wall 42 with which said cam-shaped roll 41 is provided, are a pair of oppositely and radially extending slots or cut-away portions 43. The sides of said roll 41 are tapered or cut away from one slot or cut-away portion 43 to the other slot or cut-away portion thus forming suitable cam-surfaces 44, and arranged beneath the narrow ends of the cams thus formed are thin plates 45 which correspond in width to the widest part of said cam-shaped roll 41. Slidably arranged within the said slots or cut-away portions 43 are suitable push-devices or elements 46 which may be in the form of push-plates or sliding bolts connected together by means of rods 47 passing through suitable openings or perforations in said center-wall 42. In a like manner, there is mounted between the frames or members 2 and in bearings 48, the journals 49 of a label-wrapping cylinder 50, somewhat similar to the cylinder 32 herein-above described. This cylinder 50 is provided upon its outer surface with a pair of guides or ribs 51, separated by a distance equal to the width of the label which is to be placed upon or around the wrapped package of chewing-gum or other article 20. The said cylinder 50 is provided with a transverse or diametrically disposed opening or slot 52 of a suitable width for the reception of a piece of wrapped chewing-gum or other article, and slidably arranged within said opening or slot 52 is a suitable push-device or element 53 made in the form of a slidable push-plate or bolt. The said cylinder 50 is further provided on each side of the said transverse opening or slot 52 with longitudinally extending holes or openings 54 and 55, which are closed at one end, in the same manner as shown and described in connection with the cylinder 32. The outer surface of the said cylinder 50, between the said guide or ribs 51, is provided at points adjacent to said longitudinally extending holes or openings 54 and 55 with a plurality of small holes or perforations 56, the same leading into the said longitudinally extending holes or openings 54 and 55.

Each of the journals 31, 40 and 49 of the respective cylinders 32 and 50, and of the cam-shaped roll 41, are provided with gear-wheels 57, 58 and 59, respectively, the gear-wheels 57 and 58 meshing with a toothed idler 60, and the gear-wheels 58 and 59 meshing with a second toothed idler 61, all of which is clearly indicated in Fig. 11 of the drawings, the said idlers 60 and 61 being rotatably mounted upon their respective studs 62 and 63 substantially as shown. This arrangement of gearing permits of the equal rotation both in point of the number of revolutions and the direction thereof, of the cylinders 32 and 50, and the cam-shaped roll 41, as will be clearly evident. In order to secure the proper operation of the said cylinders 32 and 50 and cam-roll 41, they should make a one-half revolution to every revolution of the main-driving shaft 21; and, to secure this result, there is secured upon said driving shaft 21 a semi-circular or half-gear 64 which is adapted to mesh operatively with the gear 57 of the cylinder 32. In order to secure, after each half-revolution of the said cylinders 32 and 50 and said cam-roll 41, a proper horizontal alinement of their respective slots or opening 33 and 52 and the cut-away portions 43, there is arranged in connection with the half-gear 64 and the gear 57 of the cylinder 32, a pair of cam-like members 65 and 66, the latter being provided with oppositely arranged cut-away portions 67 adapted to be engaged by the cam-like member 65, so as to cause the proper completion of a half revolution of the gear 57 in a manner clearly to be understood from an inspection of the drawings, and more particularly of said Fig. 11.

Suitably disposed and arranged beneath the cylinder 32 is a suitable receptacle or holder 68 adapted to contain a quantity of wrapping paper 69. The receptacle or holder 68 comprises a frame-work 70 which may be secured, by means of suitable brackets 71, to the under edges of said side frames or members 2, either by means of screws 72, or other suitable fastening devices. Suitably secured to the bottom of said frame-work 70 is a perforated guide-plate 73, said plate being provided with an outwardly extending arm 74 having a perforated hub 75 upon its free end. Slidably arranged in the perforation of said guide-plate 73 is a rod 76 which extends upwardly into the interior of the frame-work 70, and secured upon the upper end of said rod, by means of a suitable socket-member 77, is a table or supporting plate 78 upon which are piled the sheets of wrapping-paper 69, the same having been already cut to the proper size so as to be ready for use, the uppermost sheet of this pile of wrapping paper 69 resting directly against the under side of the cylinder 32. In order to assure the proper taking up of said wrapping paper 69 by the cylinder 32, in a manner to be subsequently described, it is necessary to keep the pile of paper against said cylinder 32, and to accomplish this result, I have a pair of circular pulleys 79 which are eccentrically mounted and secured upon a shaft 80, the latter being rotatably arranged in said perforated hub 75. Extending over a portion of the peripheral surfaces of said pulleys 79 are cords 81, or other flexible connections, the ends 82 thereof being secured to a cross-bar 83 arranged or secured to the lower end of said rod 76, and secured to the opposite ends 84 of said cords 81 is a cross-bar 85 from which is suspended, in any suitable manner, a balance or weight 86. This weight 86, by means of the cords 81 and pulleys 79, exercise a pull upon said rod 76 whereby the latter is caused to press in an upward direction against the wrapping-paper 69 so as to keep the same constantly in its proper relation and its upper sheet bearing against the cylinder 32. The object of arranging the pulleys 79 eccentrically upon said shaft is to compensate between the changing weight of the pile of paper 69 which becomes lighter as piece after piece is removed by means of the cylinder 32. This compensation is brought about by the change in leverage of the pulleys 79, the leverage being shortened upon the side of the balance or weight 86 and increased upon the side of the pile of paper 69, as the latter decreases in weight and is moved upwardly to keep the same in proper relation with said cylinder 32.

Suitably disposed and arranged beneath the cylinder 50 is a similar receptacle or holder 87, in which are placed a quantity of labels 88, which are to be placed around and upon the wrapped packages of chewing-gum 20, or other package. The construction and operation of the said receptacle or holder 87 is practicably identical with that described and shown in connection with the wrapping-paper receptacle or holder 68. The said receptacle or holder 87 comprises a framework 89, and brackets 90, through which pass the screws 91 which are used to secure said framework 89 to the under edges of said sides or frames 2. The said receptacle or holder 87 furthermore comprises a perforated guide-plate 92, having an outwardly extending arm 93 which is provided with a perforated hub 94. A rod 95 is slidably arranged in the perforation of said guide-plate 92, said rod carrying upon its upper end a socket-member 96 and a table or supporting plate 97 upon which are piled the proper sized labels 88, ready for use. A pair of pulleys 98 are arranged eccentrically upon a shaft 99, said shaft being rotatably arranged in said perforated hub 94. Extending over said pulleys 98 are suitable flexible connections or cords 100, the ends 101 thereof being attached to a cross-bar 102 which is secured to the lower end of said rod 95; and, secured to the opposite ends 103 of said cords 100 is a cross-bar 104 from which is suspended a balance or weight 105.

Suitably secured upon the frames or members 2, at a point between the cylinder 50 and the cam-roll 41, are a pair of posts 106, to which is secured and upon which is supported in any suitable manner, a laterally extending cross-bar 107. Pivotally connected with said cross-bar 107, by means of bolts and nuts 108, or any other suitable means, are the hubs 109 of a pair of downwardly extending and outwardly curved arms 110 which carry upon their lower or free ends suitable rollers 111, said rollers being mounted upon studs 112. The said rollers 111 are adapted to ride upon the cam-surfaces 44, in the manner shown more particularly in Figs. 8, 9 and 10 of the accompanying drawings. The said arms 110 are provided with studs 113 to which are secured the ends of a coiled spring 114, the purpose of which is to draw the two arms 110 toward each other and thereby cause their respective rollers 111 to always bear against the cam-surfaces 44 upon the opposite sides of said cam-roll 41. Secured upon each side or frame 2, and extending therefrom to the sides of the roll 41 are folder lugs or gages 115. The said cross-bar 107 is provided with a suitable slot or opening 116 in which one of the said bolts and nuts 108 is arranged, in order to permit of a proper adjustment of the fulcrum of the said arms 110.

Arranged between its side-arms 4 of said supporting bracket 5, and secured thereto in any suitable manner, so as to be in alinement with the horizontal position of the slot or opening 52 of said cylinder 50, is a conveyer member or chute 117, between the ends of the side walls 118 of which are rotatably mounted in the slotted bearings 119 with which said side walls 118 are provided, a pair of rollers 120 which are capable of a vertical play. Secured upon the side-arms 4 of said supporting bracket 5, by means of screws 121 or the like, is a base-plate 122 which is adapted to support a receiving chute 123, the mouth 124 of which is arranged above the end of said conveyer member or chute 117. Rotatably mounted, in any suitable manner, between the side-arms 4 of said bracket-member 5, and beneath the conveyer-member or chute 117, is a shaft 125 upon which is rigidly secured a lever or arm 126, upon the free end of which is arranged a roller 127. The said roller 127 rides upon a lifting cam 128 secured or mounted upon a shaft 129 which is rotatably arranged between the side-arms 4 of said bracket member 5. Rigidly secured to said shaft 125 are a pair of arms or levers 130, upon the free ends of which are pivotally secured the side-frames or members 131 of a lifting device, the said frames or members 131 being provided at their upper ends with an upwardly extending member 132, from the upper end of which extends a pair of horizontal fingers or carriers 133, which normally rest beneath the end of said conveyer-member or chute 117, the latter being provided with cutaway portions 134 so as to permit of the upward passage of said fingers or carriers 133 through the end of said conveyer member or chute 117, at proper times during the operation of the machine. The lower ends of said frames or members 131 are joined by a cross-bar 135 adapted to be engaged by a tipping-cam 136, which is secured in proper position upon said shaft 129. A coiled spring 137 is secured between a hook 138, or the like, and one of the side-members 131 of said lifting device for the purpose of keeping the latter in its normal position. The means for revolving said shaft 129 to properly operate the lifting devices above mentioned, comprises a sprocket-wheel 139, or the like, which is secured upon one end of said shaft 129, the said sprocket-wheel 139 being driven by means of a similar sprocket-wheel 140, or the like, secured upon the end of the main driving shaft 21, by means of a connecting chain-drive 141, or the like.

Pivotally secured to a pair of posts 142 are a pair of arms 143, to the free ends of which is secured by means of screws 144, or other suitable fastening means, a cross-bar 145. Secured to and supported by the said cross-bar 145 is a gum or paste-containing cup or reservoir 146, which is provided in its bottom with a suitable mouth or spout 147. Secured to the bottom of said cup or reservoir 146 is a bracket 148 in the free end of which is adjustably arranged a set-screw 180

149; the free end of which is adapted to ride upon the surface of said cylinder 50, and at proper times comes in engagement with a pair of elongated concave depressions 150 with which each half of said cylinder 50 is provided. for the purpose of raising and lowering the cup or reservoir at proper intervals.

Arranged upon a portion of the journals 31 and 49 of the respective cylinders 32 and 50, and between the ends of said cylinders and the inner side of one of the frames or members 2, so as to be capable of an oscillatory movement upon said journals 31 and 49, are a pair of slide-valves 151. The said slide-valves 151 are each provided with a semi-circular channel or air-passage 152, into which extends a hole or opening 153 forming an air-passage leading from suitable air-outlet pipes 154 which are secured to and form a part of said slide-valves 151. Operatively connected with said air-outlet pipe 154 is a hose or conduit-member 155 which in turn is connected with an exhaust air pump of any desirable form or construction. The said channels or air-passages 152 of said valves 151 are adapted to register alternately with one of each pair of longitudinally extending holes or openings 34 and 35, and 54 and 55 of the respective cylinders 32 and 50, for the purpose of connecting the said longitudinally extending holes or openings of said cylinders with the said exhaust pump. The means for oscillating said slide-valves, so as to secure the above described result, is produced by the following devices. Connected with each of said valves 151 is an upwardly extending arm 156, said arms being provided with slotted heads or ends to which is pivotally secured a connecting rod 157 adapted to join the same together so as to assure the simultaneous movements and operations of the said valves 151 with respect to their cylinders 32 and 50. Mounted upon one end of said journal 49, so as to oscillate thereon, is a bell crank 158 the upper lever or arm of which is provided with an extension or member 159, and the free end of which is pivotally connected with one of said upwardly extending arms 156. The lower lever or arm of said bell crank 158 is pivotally connected with a cam-link 160, secured upon the outer end of which is a roller 161, which rides upon an operating cam 162, said cam being rigidly secured upon said main driving shaft 21, so as to revolve therewith. The said cam-link 160 is also provided with a downwardly extending and perforated lug 163 to which is secured the one end of a coiled spring 164, the other end of said spring being secured in any suitable manner to the frame or member 2, and the purpose of said spring 164 being to cause a proper co-action of the cam-link 160 and its roller 161 with the operating cam 160, to properly operate the valves 151 in their relation with their respective cylinders 32 and 50, all of which will be clearly understood from an inspection of Figs. 1 and 2 of the drawings.

Referring now to the automatic clutch-mechanism connected with the driving-pulley 22, the same consists of the following devices for which see more particularly Figs. 2, 3, 4, 18, 19, 20 and 21 of the drawings. Secured to the main driving shaft 21, by means of a key 165, or in any other suitable manner, is the tubular hub 166 of a clutch-disk 167. The pulley 22 is loosely mounted upon said hub 166, so as to revolve freely thereon, and is retained in place by means of a collar 168 secured upon the end of said hub 166 by means of a set-screw 169, or the like. The said clutch-disk 167 is provided upon its outer edge or periphery with a notch or cutaway portion 170, and arranged upon the said hub 166 of said clutch-disk 167 is a clutch releasing disk 171, the same being provided with a concave depression or cutaway portion 172 in its outer edge or periphery. The bottom of said concave depression or cut-away portion 172 under normal conditions registers with the notch or cutaway portion 170 of said clutch-disk 167. The inner side of said clutch releasing disk 171 is provided with a concentric groove or channel 173 which is adapted to register with a similar concentric groove or channel 174 with which said clutch-disk 167 is provided. Arranged within the space thus formed between the two disks is a coiled spring 175, one end of which is secured to a hook 176, or other suitable retaining means, connected with said clutch-disk 167, and the other end of which is secured to a similar hook 177, or the like, connected with the clutch releasing disk 171. The function of said coiled spring 175 is to return said disks to their normal relation, one with the other, so that the bottom of the said concave depression or cutaway portion 172 of the one disk will register with the bottom of the notch or cutaway portion 170 of the other disk, after being disturbed.

Pivotally secured by means of a stud-screw 178, or the like, upon the side face of the pulley 22 and adjacent to the disks 167 and 171 is a dog 179, the end of which is adapted to normally engage with the notch or cutaway portion 170, of the clutch-disk 167, whereby the revolutions of said pulley 22 are transmitted to said clutch-disk 167 and said main driving shaft 21. The end of said dog 179 is further provided with an outwardly extending lug 180 which normally lies in the bottom of said concave depression or cutaway portion 172 of said clutch-releasing disk 171. A spring 181 secured to the said pulley 22, by means of a screw 182, or the like, retains said dog 179 in engagement either with the cut-away portions of the said disks 167 and 171 as above described, or with the outer edge or periphery of said disks. The said clutch-disk 167 is furthermore provided with a slot or opening 183, into which penetrates a pin or stud 184 which is rigidly secured to said clutch-releasing disk 171, the functions of these portions being to provide a stop whereby the said disks may always return to their normal relations, one with the other, when actuated by the said spring 181. The said clutch releasing disk 171 is further provided, at a proper location upon its edge or periphery, with a notch or cutaway portion 185. Mounted upon said shaft 24 so as to oscillate thereon, is a bell-crank lever 186 the upper end 187 of which is forked so as to straddle and support a trigger-lever 188, the notched portion 189 of which is in engagement with said bell-crank lever 186. The said trigger-lever 188 is provided at one end with an upward extending portion 190 which normally rides against the under side of the push-plate 12. The said trigger lever 188 is further retained in an operative position by reason of the fact, that its upper edge projects into the said groove 9 and slot or opening 10 of the bed-plate 8, hereinabove described. The said bell-crank lever 186 is further provided with an outwardly extending member 191, and the upwardly extending portion 190 is retained in its normal engagement with the under side of the said push-plate 12 by means of a coiled spring 192, one end of which is secured to the outer end of said trigger-lever 188 and the other end of which is secured by any suitable means to a portion of said outwardly extending member 191 of said bell-crank lever 186, or to any other suitable point. The said bell-crank lever 186 is retained in its normal position by means of a spring 193, one end of which is secured to the outer end of one of said side frames or members 2, and the other end thereof is secured to the upper end 187 of said bell-crank lever 186, by any suitable retaining means.

Mounted upon the end of the shaft 24, at a point adjacent to the periphery of the above described clutch releasing disk 171, is a dog or pawl 194, the nose or member 195 of which, at proper times, engages with the notch or cutaway portion 185 of said clutch-releasing disk 171. The said dog or pawl 194 is operated by means of a connecting rod 195, extending between the said dog or pawl and the outwardly extending member 191 of the said bell-crank lever 186, and by means of which the movement of said bell-crank lever 186 is imparted to said dog or pawl 194.

The operation of the above described automatic clutch-mechanism briefly is as follows:—In the first place, the clutch mechanism is kept in its normal driving condition by the weight of the pieces of chewing-gum or other articles 20 contained in the feed-chute 19. As the push-plate 12 draws back, to allow a piece of the gum 20, candy, or the like, to fall in front of the plate, the weight of the column of gum 20, or other articles of merchandise, in the feed-chute 19, falls or drops upon the upwardly-extending end 190 of said trigger-lever 188 and prevents the same from coming into engagement with the slotted end 197 of said push-plate 12, but rather holds said upwardly extending end 190 of said trigger-lever 188 down so that the said push-plate 12 will pass over said trigger-lever 188. As soon as the feed-chute 19 is emptied of the gum 20, or other articles, and the said push-plate 12 draws back to receive said piece of gum 20, or the like, the weight of the gum or other article, no longer falling upon the upwardly extending end 190 of said trigger-lever 188, the spring 192 causes the said trigger-lever to oscillate or tip so that said upwardly extending end 190 moves in an upward direction in front of the push-plate 12 and is carried forward by the same, in the manner shown more particularly by the dotted lines in Fig. 19 of the drawings. This forward movement of the trigger-lever 188 causes a rocking motion of the bell-crank lever 186, and the rocking motion thereof being transmitted by the rod 196 to the pawl or dog 194, the nose 195 of which is turned toward the periphery of the clutch-releasing disk 171, until it penetrates and engages the notch or cut-away portion 185 of said clutch releasing disk 171. This causes the revolution of said clutch-releasing disk 171 to be arrested, and when the same is thus stopped, the dog 179, which is carried by the continuously revolving pulley 22 and the end of which dog 179 is in normal driving engagement with the notch or cutaway portion 170 of the said clutch-disk 167, is lifted out of its normal engagement with said notch or cutaway portion 170, because the outwardly extending lug 180 of said dog 179 is driven up the concave or inclined side of the concave depressions or cutaway portion 172 of said clutch releasing disk 171 which is being held stationary by said dog or pawl 194. Thus, the clutch-disk 167, which is keyed to the main-driving shaft 21, is brought to a stop and the pulley 22 revolves freely, carrying the dog 179 around the peripheral surfaces of the disks 167 and 171 until the dog or pawl 194 is disengaged from its holding contact with said clutch releasing disk 171 and is allowed to resume its normal relation with the clutch-disk 167, and thereby permits the dog 179 to again engage the notch or cutaway portion 170, so as to revolve said clutch disk. Of course, as soon as more gum 20 is placed in the feed chute 19, its weight will release the trigger-member 188 and through the mechanism described will release the dog or pawl 194 from engagement with said clutch-release disk 171.

Having thus described the devices and their construction, which form the novel wrapping machine embodying the principles of my present invention, it remains to describe how the machine carries on the wrapping operations.

The feed-chute 19 is filled with the cakes or pieces of gum 20, or other articles of merchandise, which are to be wrapped in paper and inclosed in a label. The push-plate 12 is drawn outwardly by operation of the cam 23 and bell-crank 25 which are driven by the main shaft 21, until a piece of the gum 20, or the like, drops down in front of the end of said push-plate 12. While the push-plate is moving back to accomplish this purpose, the slide-valve 151 occupies a position with relation to the cylinder 32, approximately that illustrated in Figs. 13 and 14 of the drawings, which permits the air to be sucked out of the lower longitudinally extending hole 34, through the air-passage 152, 153 and the outlet pipe 154, and by means of the hose 155 which is attached to the exhaust fan or pump. This causes the outside air to be sucked through the holes or perforations 37, whereby the top piece of wrapping paper 69 contained in the holder 68 is sucked and held against the cylinder 32, which is simultaneously making a half revolution, being driven by the half-gear 64 in mesh with the cylinder-gears 57, so that the paper is drawn around in front of the gum 20 which in turn rests in front of the push-plate 12. The said piece of paper then lies directly in front of the transverse opening 33 of said cylinder 32 which at the end of said revolution of said cylinder assumes a horizontal position in alinement with the said push-plate 12. The push-plate then starts to move toward the cylinder 32, pushing the piece of gum, or other article against the paper 69 and thereby inserts the paper and gum in the transverse opening 33, so that the paper is folded around the piece of gum, or other article as shown more particularly in Fig. 6 of the drawings. As soon as the push-plate 12 begins its movement toward the cylinder 32, the high point of the cam 162 which has been operated through the cam-link 160, the bell-crank 158, upwardly extending members 156, and their connecting rod 157, to keep the air-passages of said slide-valve 151 in registration with the hole or opening 34, as it moves upwardly with the revolution of said cylinders 32, passes off the roller 161 of said cam-link 160 and the spring 164 reverses the movement of said cam-link 160 and the parts which connect the same with the slide-valve 151, so that the latter flies back, thus closing the hole or opening 34 and registering the air-passage 152 with the hole or opening 35, which as the cylinder 32 has revolved, reaches the position on the under side of said cylinder ready to take up the next piece or sheet of paper.

By the time the push-plate 12 has inserted the paper and gum, or other article in the transverse opening 33 of the cylinder 32 and starts to move outwardly again, the half-gear 64 again comes around and meshes with the gear 57, and revolves the said cylinder 32, thereby carrying the paper and gum, or other article, around until they are opposite and in alinement with one of the openings or cut-away portions 43 of said cam-roll 41. As another piece of gum, or other article, and paper are pushed into the cylinder 32 by means of the push-plate 12, as hereinabove described, the bolt or push-plate 34' is pushed through the transverse opening 33 by the entering paper and gum, thereby ejecting the partially wrapped piece of gum at the other end of said transverse opening 33 and forces the same into the opening or cut-away portion 43 of said cam-roll 41, thus making the last longitudinal fold of the wrapping paper. Operated through the train of gears, shown in Fig. 11 of the drawings, the said cam-roll 41 makes a half revolution simultaneously with said cylinder 32 and in so doing carries over the longitudinally wrapped gum, or other article, toward the cylinder 50. The rollers 111 on the swing-arms 110 in the meantime follow the cam-surfaces 44 of said cam roll 41, from the narrow part of the cam to the widest part thereof, thereby bringing the rollers in position to engage the projecting ends of the paper which ends are then turned over and around the ends of the thin plates 45 of said cam-roll so that said ends of the wrapping paper are folded as will be clearly understood from an inspection of Figs. 8, 9, and 10 of the drawings. After these operations have taken place, the cam-roll 41 has made its half revolution and comes to rest with the cutaway portion or opening 43 containing the wrapped gum, or other article, opposite and in alinement with the transverse hole or opening of the cylinder 50. As another piece of gum, or other article, and paper are pushed into the cut-away portions or openings 43, adjacent to said cylinder 32 and from the said cylinder, the entering paper and gum, or other article, pushes against the push-plates or bolts 46, whereby the wrapped gum or other article upon the opposite side of said cam-roll 41 is pushed into the transverse opening 52 of the cylinder 50. In the meantime, said cylinder 50 being equipped with the valve-mechanism 151 and other devices, picks up a label.

which is not wider than the package of gum or may be slightly smaller; and, by means of the air-suction, as described in connection with cylinders 32, carries the label around so that it is presented across the front of the transverse opening 52 and in front of the wrapped gum or other article in the cam-roll 41. As the end of the label is carried around under the gum or paste-containing cup or reservoir 146, the same is caused to dip downwardly as the guide-screw 149, carried by the bracket 148, falls into the slot or concave depression 150 in the surface of the cylinder 50, and thereby the spout or mouth 147 of said cup or reservoir 146 is brought in contact with the label, whereby it deposits a touch of gum or paste thereon and then lifts again or moves away from the label. As the wrapped piece of gum, or other article is pushed out of said cam-roll 41 and into the transverse opening 52 of said cylinder 50, the label is partially wrapped upon said wrapped-gum, or other article. The cylinder 50, through the gearing, makes a half revolution which brings the wrapped gum, or other article, and label around in front of the conveyer-member or chute 117; and, the push-piece or bolt 53 arranged in the transverse opening 52 of said cylinder 50, when operated upon by another entering piece of wrapped gum or the like, ejects or forces the wrapped gum and label, on the opposite side of said cylinder 50, out of the same and into the conveyer-member 117, the gummed edge or end of the label being forced beneath the rollers 120, whereby the label is securely fastened around the package and its wrapping operations are completed.

Piece after piece of wrapped and labeled gum is pushed on through the conveyer member or chute 117 and beneath the mouth 124 of a receiving chute 123. The apparatus for lifting said packages of gum, as I will now term them, operate as follows: The column of packages in the chute 123 is supported by or upon the fingers 133 of the lifting device, while a package is being deposited beneath the mouth of the said chute. When the package is so placed, the tipping-cam 136, which is operated by the properly timed and revolving shaft 129, pushes against the cross-bar 135 of the frame-work of said lifting device, which being pivotally arranged upon the free ends of said supporting levers or arms 130, is tipped by said tipping cam in such a manner so as to withdraw the supporting fingers 133 from under the column of packages in the chute and allows the same to drop upon the newly deposited package placed beneath the mouth of said chute in the manner previously stated. As the fingers 133 are so withdrawn the whole lifting device is caused to drop, by reason of the fact that the roller 127 of the operating lever 126, which is rigidly secured to the shaft 125, upon which are also secured the arms 130 which support the lifting device, falls from the high point of a lifting cam 128, upon said shaft 129, and drops to the low point of said lifting-cam 128, and whereby the shaft 125 is oscillated. Consequently the supporting arms 130 of said lifting device swing or move downwardly, thereby carrying said lifting device therewith. The coiled spring 137 returns the frame-work of said lifting device, to its normal initial position, with the fingers 133 thereof underneath and in registration with the cutaway portions 134 of said conveyer-member or chute 117, and ready to pass therethrough, when again operated by means of the lifting cam 128 and the intermediate mechanisms, for the purpose of again lifting the column of wrapped packages to permit another package to be deposited beneath said column.

While the various operations above described have been each separately described, it will be clearly understood that owing to the construction of the machine many of those operations are performed simultaneously. In other words the gum, or other article, is passed through the machine in such a manner, so that several pieces are being operated upon at the same time to perform some one or another of the wrapping operations.

From the above description it will be readily understood that my invention provides a wrapping-machine of a very high order of efficiency, and yet of comparatively simple mechanism, both as to construction and operation.

I am aware that changes may be made in the general arrangements and combinations of the various devices and parts, as well as in the details of the construction of the same, without departing from the scope of my present invention as set forth in the foregoing specification and as defined in the appended claims. Hence I do not limit my invention to the exact arrangements and combinations of the devices and parts as described in the said specification, nor do I confine myself to the details of the construction of the said parts as illustrated in the accompanying drawings.

I claim:—

1. In a wrapping-machine, the combination of a series of rotary receiving elements, comprising a wrapper-cylinder provided with a transverse opening, a cam-roll provided with suitable transverse openings and further provided with cam-surfaces upon the vertical sides thereof, and a label-cylinder provided with a transverse opening, means for producing an intermittent rotary movement of said receiving elements, means for feeding articles to be wrapped and wrapping material into said transverse openings of said receiving elements, means connected with said receiving-elements for passing said articles and wrapping-material from one rotary receiving-element to another, and means coöperating with the said cam-surfaces of said cam-roll for producing the end folds of the wrapped article, substantially as and for the purposes set forth.

2. In a wrapping-machine, the combination of a series of rotary receiving-elements, comprising a wrapper-cylinder provided with a transverse opening, a cam-roll formed with cam-shaped sides and provided with suitable transverse openings and further provided with cam-surfaces upon the vertical sides thereof, and a label cylinder provided with a transverse opening, means for producing an intermittent rotary movement of said receiving-elements, a wrapping-material receptacle, means coöperating with said wrapper-cylinder for removing wrapping material from said receptacle and presenting the same in its initial wrapping position across the mouth of said transverse opening of said wrapper cylinder, means for feeding articles to be wrapped and wrapping-material into said transverse opening of said wrapper-cylinder, a label-receptacle, means coöperating with said label-cylinder for removing a label from said label-receptacle and presenting the same in its initial wrapping position across the mouth of said transverse opening of said label-cylinder, means connected respectively with said wrapper cylinder, cam-roll, and label-cylinder for passing said articles with their wrappings from one to another successively, and pivoted arms provided with rollers coöperating with the cam-shaped sides of the cam-roll to fold the projecting ends of the wrapper, substantially as and for the purposes set forth.

3. In a wrapping-machine, the combination of a series of rotary receiving-elements, comprising a wrapper-cylinder provided with a transverse opening, a cam-roll provided with suitable transverse openings and further provided with cam-surfaces upon the vertical sides thereof, and a label cylinder provided with a transverse opening, means for producing an intermittent rotary movement of said receiving-elements, a wrapping-material receptacle, means coöperating with said wrapper-cylinder for removing wrapping material from said receptacle and presenting the same in its initial wrapping position across the mouth of said transverse opening of said wrapper-cylinder, means for feeding articles to be wrapped and wrapping-material into said transverse opening of said wrapper-cylinder, a label-receptacle, means coöperating with said label-cylinder for removing a label from said label-receptacle and presenting the same in its initial wrapping position across the mouth of said transverse opening of said label cylinder, means connected respectively with said wrapper-cylinder, cam-roll, and label-cylinder for passing said articles with their wrappings from one to another successively, and means coöperating with the said cam-surfaces of said cam-roll for producing the end folds of the wrapped article, substantially as and for the purposes set forth.

4. In a wrapping-machine, the combination of a series of rotary receiving-elements, comprising a wrapper-cylinder provided with a transverse opening, a cam-roll formed with cam-shaped sides and provided with suitable transverse openings and further provided with cam-surfaces upon the vertical sides thereof, and a label cylinder provided with a transverse opening, means for producing an intermittent rotary movement of said receiving-elements, a wrapping-material receptacle, means coöperating with said wrapper-cylinder for removing wrapping material from said receptacle and presenting the same in its initial wrapping position across the mouth of said transverse opening of said wrapper cylinder, means for feeding articles to be wrapped and wrapping-material into said transverse opening of said wrapper-cylinder, a label-receptacle, means coöperating with said label-cylinder for removing a label from said label-receptacle and presenting the same in its initial wrapping position across the mouth of said transverse opening of said label cylinder, means connected respectively with said wrapper cylinder, cam-roll, and label-cylinder for passing said articles with their wrappings from one to another successively, said means comprising push-plates slidably arranged in said transverse openings of the respective wrapper-cylinder, cam-roll, and the label-cylinder, and pivoted arms provided with rollers coöperating with the cam-shaped sides of the cam-roll to fold the projecting ends of the wrapper, substantially as and for the purposes set forth.

5. In a wrapping-machine, the combination of a series of rotary receiving-elements, comprising a wrapper-cylinder, a cam-roll, and a label-cylinder, each provided with a transverse opening therein, push-plates slidably arranged in said transverse openings, means for producing an intermittent rotary movement of said receiving-elements, and means for feeding articles to be wrapped and wrapping material into said transverse openings of said receiving-elements, comprising a bed-plate, a slidable push-plate, a main driving-shaft, a cam-element upon said shaft, a bell-crank, a yoke-arm connected with said bell-crank operatively engaging with said cam-element, means connecting said bell-crank with said push-plate to produce a reciprocatory sliding motion thereof, and a feed-chute arranged above said push-plate, substantially as and for the purposes set forth.

6. In a wrapping-machine, the combination of a series of rotary receiving-elements, comprising a wrapper-cylinder, a cam-roll, and a label-cylinder, each provided with a transverse opening therein, push-plates slidably arranged in said transverse openings, means for producing an intermittent rotary movement of said receiving-elements, and means for feeding articles to be wrapped and wrapping material into said transverse openings of said receiving-elements, comprising a bed-plate, a suitable push-plate, a main driving-shaft, a cam-element upon said shaft, a bell-crank, a yoke-arm connected with said bell-crank operatively engaging with said cam-element, means connecting said bell-crank with said push-plate to produce a reciprocatory sliding motion thereof, and a feed-chute arranged above said push-plate, a wrapping material receptacle and a label receptacle, means coöperating with said wrapper-cylinder and said label-cylinder for removing wrapping material and a label from said respective receptacles and presenting the same in their respective initial wrapping positions across the transverse openings, respectively of said wrapper-cylinder and said label-cylinder, substantially as and for the purposes set forth.

7. In a wrapping-machine, the combination of a series of rotary receiving-elements, comprising a wrapper-cylinder provided with a transverse opening, a cam-roll provided with suitable transverse openings and further provided with cam-surfaces upon the vertical sides thereof, and a label-cylinder provided with a transverse opening, means for producing an intermittent rotary movement of said receiving elements, means for feeding articles to be wrapped and wrapping material into said transverse openings of said receiving elements, means connected with said receiving-elements for passing said articles and wrapping-material from one rotary receiving-element to another, and means coöperating with the said cam-surfaces of said cam-roll for producing the end folds of the wrapped article, comprising a frame-work, a pair of downwardly extending arms pivotally secured to said frame-work, rollers upon the free ends of said arms adapted to engage with the cam-surfaces of said cam-roll, and a guide-plate over which the folds are made by said rollers pressing the wrapping material thereover, and a coiled spring connecting said downwardly extending-arms whereby said rollers are maintained operatively against the cam-surfaces of said cam-roll, substantially as and for the purposes set forth.

8. In a wrapping-machine, the combination of a series of rotary receiving-elements, a main driving shaft, means for producing an intermittent rotary movement of said receiving-elements, wrapping material receptacles, means coöperating with certain of said receiving-elements for removing wrapping material from said receptacles and presenting the same in its initial wrapping position, means for feeding articles to be wrapped and said wrapping-material into said receiving-elements, means connected with said receiving-elements for passing said articles and wrapping material from one receiving-element to another, means coöperating with one of said receiving-elements for producing the end-folds of the wrapped articles, and means for receiving the wrapped articles and depositing the same in a receiving chute, the same comprising a conveyer-member provided at its receiving end with pressure-rolls adapted to firmly seal the adhesive portion of the label of a wrapped article, a receiving chute arranged above one end of said conveyer-member, and means for lifting the wrapped articles in the receiving-chute while another of said articles is being deposited beneath the mouth thereof, substantially as and for the purposes set forth.

9. In a wrapping machine, in combination, a pair of wrapping rolls, and an intermediately disposed roll for transmitting a partially wrapped article from the first wrapping roll to the second wrapping roll, each wrapping roll being provided with a diametrically disposed opening extending from one side of the roll to the other side thereof, and the transmitting roll being provided with a pair of oppositely located radial openings, means for feeding a sheet of wrapping paper in front of the opening of the first wrapping roll, means for feeding an article to be wrapped against said wrapping paper and into the said opening in said first wrapping roll, means for producing intermittent rotary movements of said rolls for bringing the partially wrapped article in front of one of the radial openings in the transmitting cylinder and feeding said article into the radial opening of said transmitting roll, means for forcing a previously admitted article from the other radial opening of said transmitting roll into the diametric opening of said second wrapping roll, means for forcing the article from said second wrapping roll, and said wrapping rolls being provided with a suction means for retaining the wrapper against said wrapping rolls, substantially as and for the purposes set forth.

10. In a wrapping machine, in combination, a pair of wrapping rolls, and an intermediately disposed roll for transmitting a partially wrapped article from the first wrapping roll to the second wrapping roll, mechanism for feeding wrappers to said wrapping rolls, each wrapping roll being provided with a diametrically disposed opening which extends from side to side of the roll for the reception of the partially wrapped article in one end of said opening, said transmitting roll being provided with a pair of oppositely located radial openings, means arranged in the diametrically disposed openings of said wrapping rolls, and in the radial openings of said transmitting roll, for feeding the partially wrapped article from the opening in one roll into the opening of an adjoining roll, and a suction means connected with each of said wrapping rolls for retaining the wrapper against the wrapping roll and registering the same with the mouth of said diametrically disposed opening therein, substantially as and for the purposes set forth.

11. In a wrapping machine, the combination with a rotary wrapping roll provided with a diametrically disposed goods-receiving opening, of means for feeding the article to be wrapped into said opening, said wrapping roll being provided with means for retaining a sheet of wrapping paper directly in front of said opening, and a holder containing sheets of wrapper paper, said holder being located adjacent to said wrapping roll so as to present the uppermost sheet therein adjacent to the path of movement of the retaining means of said wrapping roll.

12. In a wrapping machine, the combination, with a rotary wrapping roll provided with a diametrically disposed goods-receiving opening, of a suction means connected with said wrapping roll for retaining a sheet of paper directly in front of the said opening therein, a holder containing sheets of wrapping paper, said holder being located adjacent to said wrapping roll so as to present the uppermost sheet therein adjacent to the path of movement of the suction means of said wrapping roll, and means for forcing the article to be wrapped against the sheet of paper and with said sheet of paper into the opening of said wrapping roll.

In testimony, that I claim the invention set forth above I have hereunto set my hand this 19th day of January, 1909.

NATE J. MATTHEWS.

Witnesses:
E. A. GIBSON,
FREDK. C. FRAENTZEL.